US012437429B2

(12) United States Patent
Guler et al.

(10) Patent No.: US 12,437,429 B2
(45) Date of Patent: *Oct. 7, 2025

(54) THREE-DIMENSIONAL OBJECT RECONSTRUCTION

(71) Applicant: Snap Inc., Santa Monica, CA (US)

(72) Inventors: Riza Alp Guler, London (GB); Iason Kokkinos, London (GB)

(73) Assignee: Snap Inc., Santa Monica, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 18/477,146

(22) Filed: Sep. 28, 2023

(65) Prior Publication Data
US 2024/0029280 A1 Jan. 25, 2024

Related U.S. Application Data

(63) Continuation of application No. 17/301,926, filed on Apr. 19, 2021, now Pat. No. 11,816,850, which is a
(Continued)

(51) Int. Cl.
G06T 7/50 (2017.01)
G06N 3/02 (2006.01)
(Continued)

(52) U.S. Cl.
CPC ............... G06T 7/50 (2017.01); G06N 3/02 (2013.01); G06T 7/75 (2017.01); G06T 17/005 (2013.01);
(Continued)

(58) Field of Classification Search
CPC .......... G06T 7/50; G06T 7/75; G06T 17/005; G06T 19/20; G06T 2207/20084;
(Continued)

(56) References Cited

U.S. PATENT DOCUMENTS 10,282,852 B1 * 5/2019 Buibas ................ G06T 7/246
10,319,094 B1 6/2019 Chen et al.
(Continued)

FOREIGN PATENT DOCUMENTS

CN 113168710 A 7/2021
WO WO-2020099338 A1 5/2020

OTHER PUBLICATIONS

"U.S. Appl. No. 17/301,926, Corrected Notice of Allowability mailed Oct. 4, 2023", 2 pgs.
"Chinese Application Serial No. 201980075437.2, Office Action mailed Jun. 22, 2024", W/English Translation, 21 pgs.
(Continued)

Primary Examiner — David T Welch
(74) Attorney, Agent, or Firm — Schwegman Lundberg & Woessner, P.A.

(57) ABSTRACT

This disclosure relates to reconstructing three-dimensional models of objects from two-dimensional images. According to a first aspect, this specification describes a computer implemented method for creating a three-dimensional reconstruction from a two-dimensional image, the method comprising: receiving a two-dimensional image; identifying an object in the image to be reconstructed and identifying a type of said object; spatially anchoring a pre-determined set of object landmarks within the image; extracting a two-dimensional image representation from each object landmark; estimating a respective three-dimensional representation for the respective two-dimensional image representations; and combining the respective three-dimensional representations resulting in a fused three-dimensional representation of the object.

20 Claims, 7 Drawing Sheets
(3 of 7 Drawing Sheet(s) Filed in Color)

Related U.S. Application Data continuation of application No. PCT/EP2019/080897, filed on Nov. 11, 2019.

(60) Provisional application No. 62/768,824, filed on Nov. 16, 2018.

(51) Int. Cl.

| | |
|---|---|
| *G06T 7/73* | (2017.01) |
| *G06T 17/00* | (2006.01) |
| *G06T 19/20* | (2011.01) |
| *G06V 10/22* | (2022.01) |
| *G06V 10/44* | (2022.01) |
| *G06V 10/764* | (2022.01) |
| *G06V 10/82* | (2022.01) |
| *G06V 20/64* | (2022.01) |
| *G06V 40/10* | (2022.01) |

(52) U.S. Cl.
CPC ............ *G06T 19/20* (2013.01); *G06V 10/225* (2022.01); *G06V 10/454* (2022.01); *G06V 10/764* (2022.01); *G06V 10/82* (2022.01); *G06V 20/64* (2022.01); *G06V 40/103* (2022.01); *G06T 2207/20084* (2013.01); *G06T 2207/20221* (2013.01); *G06T 2207/30196* (2013.01); *G06T 2219/2004* (2013.01)

(58) Field of Classification Search
CPC ........... G06T 2207/20221; G06T 2207/30196; G06T 2219/2004; G06V 10/454; G06V 20/64; G06V 10/82; G06V 40/103; G06V 10/764; G06V 10/225; G06N 3/02
USPC ........................................................ 345/420
See application file for complete search history.

(56) References Cited

U.S. PATENT DOCUMENTS

| | | | | |
|---|---|---|---|---|
| 10,535,146 | B1* | 1/2020 | Buibas | G06T 17/00 |
| 2011/0026808 | A1 | 2/2011 | Kim et al. | |
| 2011/0267344 | A1* | 11/2011 | Germann | G06V 20/64 |
| | | | | 382/154 |
| 2012/0056800 | A1 | 3/2012 | Williams et al. | |
| 2013/0215116 | A1* | 8/2013 | Siddique | G06Q 20/40 |
| | | | | 705/26.7 |
| 2013/0250050 | A1 | 9/2013 | Kanaujia et al. | |
| 2014/0043329 | A1* | 2/2014 | Wang | G06T 17/20 |
| | | | | 345/420 |
| 2017/0329413 | A1 | 11/2017 | Kramer et al. | |
| 2017/0372505 | A1 | 12/2017 | Bhat et al. | |
| 2018/0204111 | A1 | 7/2018 | Zadeh et al. | |
| 2018/0308276 | A1* | 10/2018 | Cohen | G06T 15/205 |
| 2019/0371080 | A1* | 12/2019 | Sminchisescu | G06T 17/20 |
| 2020/0058137 | A1* | 2/2020 | Pujades | G06V 40/23 |
| 2021/0241522 | A1 | 8/2021 | Guler et al. | |
| 2021/0358197 | A1 | 11/2021 | Shysheya et al. | |

OTHER PUBLICATIONS

"Chinese Application Serial No. 201980075437.2, Response filed Sep. 30, 2024 to Office Action mailed Jun. 22, 2024", W/English Claims, 11 pgs.
"Chinese Application Serial No. 201980075437.2, Response to Examiner Telephone Interview filed Oct. 18, 2024", w/ English claims, 8 pgs.
"European Application Serial No. 19801559.6, Communication Pursuant to Article 94(3) EPC mailed Feb. 23, 2024", 4 pgs.
"European Application Serial No. 19801559.6, Communication Pursuant to Article 94(3) EPC mailed Sep. 27, 2024", 5 pgs.
"Korean Application Serial No. 10-2021-7018331, Response filed Oct. 16, 2023 to Notice of Preliminary Rejection mailed Aug. 16, 2023", w/ English claims, 21 pgs.
"Korean Application Serial No. 10-2024-7014108, Notice of Preliminary Rejection mailed Dec. 13, 2024", w/ English Translation, 5 pgs.
"Korean Application Serial No. 10-2024-7014108, Response filed Feb. 12, 2025 to Notice of Preliminary Rejection mailed Dec. 13, 2024", w/ English Claims, 14 pgs.
Anguelov, D, et al., "SCAPE: Shape Completion and Animation of People", ACM Siggraph 2005 Papers, (2005), 408-416.
Guler, Riza Alp, et al., "DensePose: Dense Human Pose Estimation in the Wild", IEEE Conference on Computer Vision and Pattern Recognition (CVPR), (Jun. 2018), 10 pgs.
Loper, Matthew, et al., "SMPL: A Skinned Mutli-Person Linear Model", ACM Transactions on Graphics, ACM, NY, US, vol. 34, No. 6, (Oct. 26, 2015), 16 pgs.
Magnenat-Thalmann, N, et al., "Joint-dependent Local Deformations for Hand Animation and Object Grasping", Proceedings on Graphics Interface '88, Canadian Information Processing Society, (1989), 26-33.
Sun, Xiao, et al., "Integral Human Pose Regression", Proceedings of the European conference on computer vision (ECCV), (2018), 17 pgs.
Tulsiani, Shubham, et al., "Viewpoints and Keypoints", Proceedings of the IEEE Conference on Computer Vision and Pattern Recognition (CVPR), (2015), 1510-1519.
Xiao, Bin, et al., "Simple Baselines for Human Pose Estimation and Tracking", arXiv:1804.06208v2 [cs.CV], (Aug. 21, 2018), 16 pgs.
"U.S. Appl. No. 17/301,926, Advisory Action mailed Feb. 21, 2023", 3 pgs.
"U.S. Appl. No. 17/301,926, Corrected Notice of Allowability mailed Jul. 13, 2023", 3 pgs.
"U.S. Appl. No. 17/301,926, Final Office Action mailed Dec. 21, 2022", 18 pgs.
"U.S. Appl. No. 17/301,926, Non Final Office Action mailed Mar. 24, 2023", 18 pgs.
"U.S. Appl. No. 17/301,926, Non Final Office Action mailed Jul. 27, 2022", 16 pgs.
"U.S. Appl. No. 17/301,926, Notice of Allowance mailed Jun. 29, 2023", 7 pgs.
"U.S. Appl. No. 17/301,926, Response filed Feb. 9, 2023 to Final Office Action mailed Dec. 21, 2022", 10 pgs.
"U.S. Appl. No. 17/301,926, Response filed Jun. 9, 2023 to Non Final Office Action mailed Mar. 24, 2023", 10 pgs.
"U.S. Appl. No. 17/301,926, Response filed Oct. 25, 2022 to Non Final Office Action mailed Jul. 27, 2022", 10 pgs.
"International Application Serial No. PCT/EP2019/080897, International Preliminary Report on Patentability mailed May 18, 2021", 14 pgs.
"International Application Serial No. PCT/EP2019/080897, International Search Report mailed Mar. 18, 2020", 6 pgs.
"International Application Serial No. PCT/EP2019/080897, Invitation to Pay Additional Fees and Partial Search Report mailed Jan. 14, 2020", 14 pgs.
"International Application Serial No. PCT/EP2019/080897, Written Opinion mailed Mar. 18, 2020", 13 pgs.
"Korean Application Serial No. 10-2021-7018331, Notice of Preliminary Rejection mailed Aug. 16, 2023", W/English Translation, 15 pgs.
Bogo, Federica, et al., "Keep It SMPL: Automatic Estimation of 3D Human Pose and Shape from a Single Image", International Conference On Financial Cryptography And Data Security; [Lecture Notes In Computer Science; Lect.Notes Computer]. Springer. Berlin. Heidelberg, (2016), 561-578.
Guler, Riza Alp, et al., "HoloPose: Holistic 3D Human Reconstruction In-The-Wild", CVPR, (Jun. 20, 2019), 11 pgs.
Kanazawa, Angjoo, et al., "End-to-End Recovery of Human Shape and Pose", 2018 IEEE/CVF Conference on Computer Vision and Pattern Recognition (CVPR) IEEE Computer Society, (Jun. 1, 2018), 10 pgs.
Lassner, Christoph, et al., "Unite the People: Closing the Loop Between 3D and 2D Human Representations", Proceedings of the IEEE conference on computer vision and pattern recognition, (2017), 10 pgs.

(56) References Cited

OTHER PUBLICATIONS

Sanzari, Marta, et al., "Bayesian Image Based 3D Pose Estimation", International Conference On Financial Cryptography And Data Security; [Lecture Notes In Computer Science; Lect.Notes Computer]. Springer. Berlin. Heidelberg, (Sep. 17, 2016), 566-582.

Sigal, Leonid, et al., "Combined discriminative and generative articulated pose and non-rigid shape estimation", Nips'07 Proceedings Of The 20th International Conference On Neural Information Processing Systems, (Dec. 2007), 8 pgs.

Tung, Hsiao-Yu Fish, et al., "Adversarial Inverse Graphics Networks: Learning 2D-to-3D Lifting and Image-to-Image Translation from Unpaired Supervision", 2017 IEEE International Conference on Computer Vision (ICCV), (2017).

Varol, "BodyNet: Volumetric inference of 3D human body shapes", In ECCV, (Apr. 2018).

Zanfir, Andrei, et al., "Monocular 3D Pose and Shape Estimation of Multiple People in Natural Scenes: The Importance of Multiple Scene Constraints", In IEEE/CVF Conference on Computer Vision and Pattern Recognition (CVPR), IEEE Computer Society, (Jun. 1, 2018), 2148-2157.

Zhang, Jian, et al., "Learning 3D faces from 2D images via Stacked Contractive Autoencoder", Neurocomputing, vol. 257, (Sep. 27, 2017), 67-78.

Zhang, Quanshi, et al., "When 3D Reconstruction Meets Ubiquitous RGB-D Images", IEEE Conference on Computer Vision and Pattern Recognition IEEE, (2014), 700-707.

"European Application Serial No. 25180480.3, Extended European Search Report mailed Aug. 8, 2025", 9 pgs.

* cited by examiner

| Evaluation Type | Base perf. | *LKps-2D* | *LKps-3D* | *LDP* | *LKps-2D + LDP* | *LKps-3D + LDP* |
|---|---|---|---|---|---|---|
| DensePose (FR10) | 51.1 | 45.8 | 52.3 | 43.3 | 43.1 | 44.6 |
| 3D Keypoints (*PA MPJPE*) | 50.56 | 52.32 | 46.78 | 56.87 | 51.20 | 46.52 |

THREE-DIMENSIONAL OBJECT RECONSTRUCTION

CLAIM OF PRIORITY

This application is a continuation of U.S. patent application Ser. No. 17/301,926, filed on Apr. 19, 2021, which is a continuation of PCT Application Serial No. PCT/EP2019/080897, filed on Nov. 11, 2019, which claims the benefit of priority to U.S. Provisional Application Ser. No. 62/768,824, filed on Nov. 16, 2018, each of which is incorporated herein by reference in its entirety.

FIELD

This disclosure relates to reconstructing three-dimensional models of objects from two-dimensional images.

BACKGROUND

Three-dimensional reconstruction from a single image is a fundamentally ill-posed problem, but humans perform it routinely when looking at a picture. Prior information about geometry can leverage on multiple cues such as object contours, surface-to-image correspondences or shading. Still, maybe the largest contribution to monocular 3D reconstruction comes from semantics: the constrained variability of known object categories can easily resolve the ambiguities in the 3D reconstruction, for instance if the object's shape is bound to lie in a low-dimensional space.

SUMMARY

According to a first aspect, this specification describes a computer implemented method for creating a three-dimensional reconstruction from a two-dimensional image, the method comprising: receiving a two-dimensional image; identifying an object in the image to be reconstructed and identifying a type of said object; spatially anchoring a pre-determined set of object landmarks within the image; extracting a two-dimensional image representation from each object landmark; estimating a respective three-dimensional representation for the respective two-dimensional image representations; and combining the respective three-dimensional representations resulting in a fused three-dimensional representation of the object.

The steps of spatially anchoring, extracting, estimating and combining may be performed in an encoder neural network. The encoder neural network may be one of a plurality of encoder networks, the method further comprising choosing the encoder neural network based on the identified object type.

The two-dimensional image may be a single image. The receiving further may comprise receiving a plurality of images, wherein the steps of spatially anchoring, extracting, estimating and combining are done for each received image; for example in real-time.

The combining may further comprise: decoupling respective estimated three-dimensional representations of object landmarks which are kinematically independent; and wherein each respective estimated three-dimensional representation comprises a corresponding set of possible orientation angles of the respective object landmark, the method further comprising applying a weighting to each orientation angle in the set of possible orientation angles based on a kinematic association of the respective object landmark to the respective possible orientation and visibility of the landmark in the received image. Prior to the weighting, the method may further comprise identifying object landmarks, within the predetermined set of object landmarks, which are not visible in the two-dimensional image.

The method may further comprise applying the fused three-dimensional representation of the object to a part-based three-dimensional shape representation model. The part-based three-dimensional shape representation model may be a kinematic tree.

According to a further aspect, this specification describes a computation unit for creating a three-dimensional reconstruction from a single two-dimensional image, the computation unit comprising: a memory; and at least one processor, wherein at least one processor is configured to perform any of the methods for creating a three-dimensional reconstruction from a two-dimensional image described herein.

According to a further aspect, this specification describes a computer readable medium that stores a set of instructions that is executable by at least one processor of a computation unit for creating a three-dimensional reconstruction from a two-dimensional image to cause the computation unit to perform any of the methods for creating a three-dimensional reconstruction from a two-dimensional image described herein.

According to a further aspect, this specification describes a computer program product comprising instructions which, when the program is executed by a computer, cause the computer to carry out any of the methods for creating a three-dimensional reconstruction from a two-dimensional image described herein.

According to a further aspect, this specification describes a method for updating a fused three-dimensional representation of an object comprised in a two-dimensional image, the method comprising: projecting the fused three-dimensional representation on to a two-dimensional image plane resulting in a projected representation; comparing respective positions of the projected representation with the object in the two-dimensional image; determining an error value based on the comparison; and adjusting parameters of the fused three-dimensional representation based on the error value, wherein the comparing, measuring and adjusting are iterated until the measured error value is below a predetermined threshold value or a threshold number of iterations is surpassed.

The comparing may further comprise: comparing respective positions of object landmarks and surface-based points of the projected representation and the two-dimensional image. The method may further comprise obtaining a Cartesian sampling or charting of a known surface model based on a detected object type of the object in the two-dimensional image.

According to a further aspect, this specification describes a computation unit for creating a three-dimensional reconstruction from a single two-dimensional image, the computation unit comprising: a memory; and at least one processor, wherein at least one processor is configured to perform any of the methods for updating a fused three-dimensional representation of an object described herein.

According to a further aspect, this specification describes a computer readable medium that stores a set of instructions that is executable by at least one processor of a computation unit for creating a three-dimensional reconstruction from a two-dimensional image to cause the computation unit to perform any of the methods for updating a fused three-dimensional representation of an object described herein.

According to a further aspect, this specification describes a computer program product comprising instructions which, when the program is executed by a computer, cause the computer to carry out any of the methods updating a fused three-dimensional representation of an object described herein.

According to a further aspect, this specification describes a system for providing a three-dimensional representation of an object identified in a two-dimensional image, the system comprising: a first computation unit configured to perform any of the methods for creating a three-dimensional reconstruction from a two-dimensional image described herein; and a second computation unit configured to perform any of the methods for updating a fused three-dimensional representation of an object described herein.

In the following, examples and embodiments will be described with reference to 3D human reconstruction. However, it will be appreciated that the methods disclosed herein can be applied to the reconstruction of other 3D objects, such as animals.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments will now be described by way of non-limiting examples with reference to the accompanying drawings, in which.

DETAILED DESCRIPTION

Figure 1:
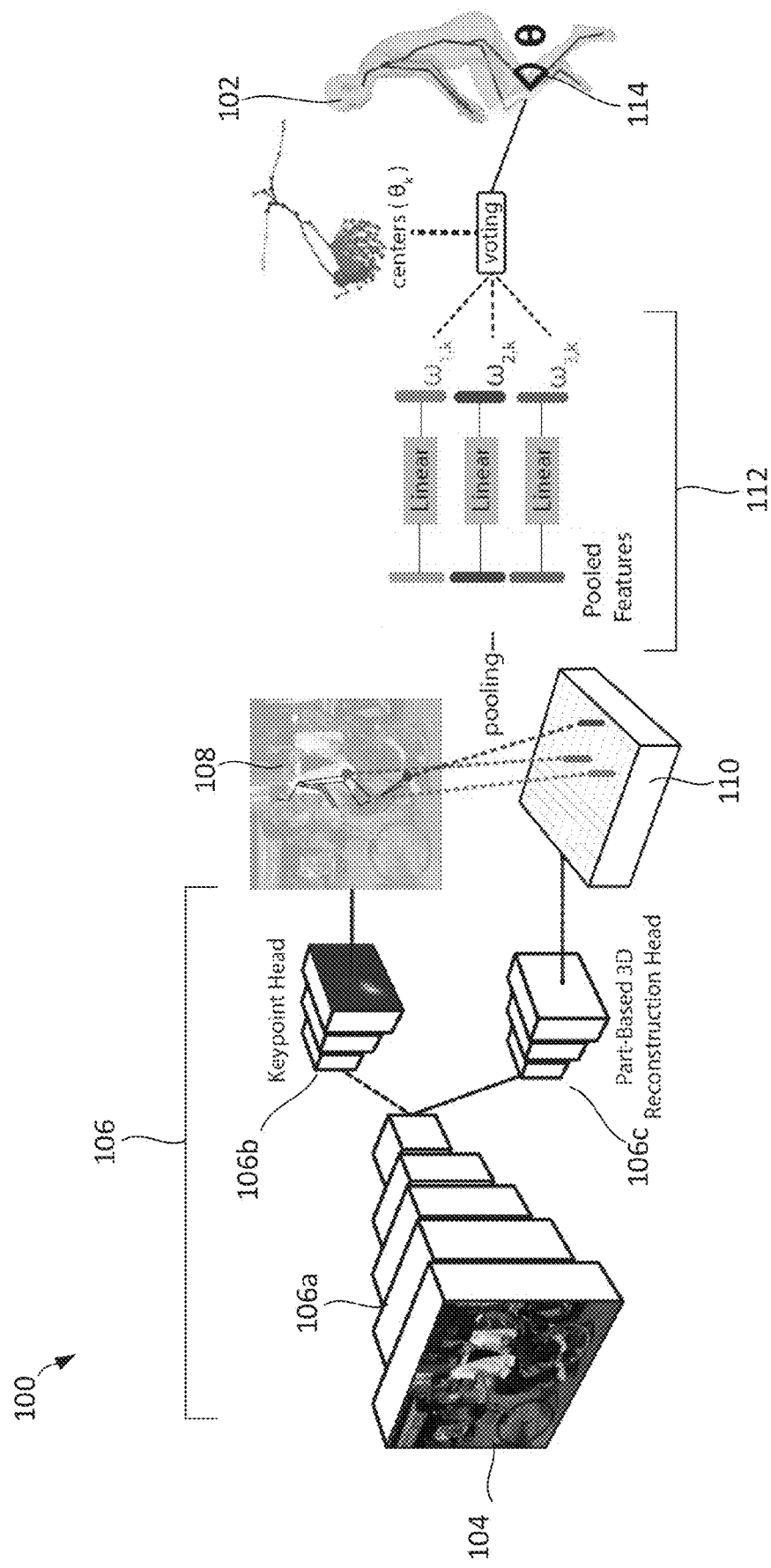
FIG. 1 shows a schematic overview of a method of part-based three-dimensional reconstruction from a two-dimensional image.

A part-based model is used in methods of monocular 3D human reconstruction. By virtue of being part-based, the methods can operate in-the-wild, gracefully handling severe occlusions and large pose variation. A multi-task network comprising 2D, 3D and Dense Pose estimation is trained to drive the 3D reconstruction task through a synergistic approach that combines bottom-up cues with top-down model fitting. Furthermore, an iterative refinement method that aligns the model-based 3D reconstructions with their image-based estimates may be used, achieving both model-based, global consistency and high spatial accuracy thanks to the bottom-up cues. The method allows for both accurate joint and 3D surface estimates on a variety of datasets. The part-based estimation reduces the 3D joint estimation error of the best published method from 56.8 to 50.56, while the refinement further decreases it to 46.52.

Morphable models have previously been used for monocular 3D face reconstruction. Extending this to the more complicated, articulated structure of the human body, monocular human body reconstruction has previously in conjunction with part-based representations, sampling-based inference, spatio-temporal inference and bottom-up/top-down, Monocular 3D reconstruction has witnessed a renaissance in the context of deep learning for both general categories and for humans in specific. Most of these works rely on the efficient parameterisation of the human body in terms of a parametric deformable model of the human body (also referred to herein as a "parametric model"). Examples of such models include, but are not limited to, skinned linear models such as the Skinned Multi-Person Linear (SMPL) model (for example "*SMPL: A Skinned Multi-Person Linear Model*", M. Loper et al, ACM SIGGRAPH Asia, 2015), Linear Blend Skinning Models (for example "*Joint-dependent Local Deformations for Hand Animation and Object Grasping*" N. Magnenat-Thalmann et al. Proceedings on Graphics Interface '88, Canadian Information Processing Society) and/or SCAPE models (for example "*SCAPE: Shape Completion and Animation of People*", D. Anguelov et al. ACM SIGGRAPH 2005). Exploiting the fact that parametric deformable models of the human body model provides a low-dimensional, differentiable representation of the human body, these works have trained systems to regress model parameters by minimizing the re-projection error between parametric deformable model of human body-based 3D keypoints and 2D joint annotations, human segmentation masks and 3D volume projections or even refining to the level of body parts.

In parallel, 3D human joint estimation has seen dramatic rise in accuracy by passing from classic, structure-from-motion approaches to 3D CNN based architectures that directly localize 3D joints in a volumetric output space through hybrids of classification and regression.

Recent work on DensePose estimation (for example "*DensePose: Dense human pose estimation in the wild*" R. A. Guler et al. The IEEE Conference on Computer Vision and Pattern Recognition (CVPR), June 2018) has also shown that one can estimate dense correspondences between RGB images and the parametric model by training a generic, bottom-up detection system to associate image pixels with surface-level UV coordinates. However, while DensePose establishes a direct link between images and surfaces, it does not uncover the underlying 3D geometry, but rather gives a strong hint about it.

Linking these separate research threads in a synergistic architecture that combines the powers of the different approaches can improve the performance of monocular 3D reconstruction. Model-based approaches to monocular 3D reconstruction estimate model parameters through a single linear layer applied on top of CNN features extracted within the object's bounding box. Such a monolithic system can be challenged by feature changes caused e.g. by occlusions, rotations, or global translations due to bounding box misalignments. For instance translations result in a permutation of the feature dimensions, by the definition of the convolution operation.

FIG. 1 shows a schematic overview of a method 100 of part-based three-dimensional reconstruction 102 from a two-dimensional image 104. A keypoint detector indicates 2D keypoint (e.g. joint) positions, driving feature pooling. These in turn are used to determine 3D model parameters of the parametric model (e.g. 3D SMPL joint angles). The method may be implemented on one or more computing devices. The method extracts localised features around key points (in the example shown, human joints) following a part-based modelling paradigm. The resulting model may be referred to as a fused three dimensional representation.

The method uses a tight prior model of the object shape (such as a deformable parametric model for human body reconstruction) in tandem with a multitude of pose estimation methods to derive accurate monocular 3D reconstruction. In embodiments relating to 3D human reconstruction, the articulated nature of the human body is taken into account, which can substantially improve performance over a monolithic baseline. A refinement procedure may also be used that allows the shape prediction results of a single-shot system to be adapted so as to meet geometric constraints imposed by complementary, fully-convolutional networks/neural network branches.

The 3D reconstruction method relies on a prior model of the target shape. The prior model may be a parametric model of the object being reconstructed. The type of prior model used may depend on the object being reconstructed. For example, in embodiments where the shape is a human body, the human body may be parametrised using a parametric deformable model. In the following, the method will be described with reference to a parametric defomable model, though it will be appreciated that other parametric shape models may alternatively be used. In some embodiments, SMPL is used. SMPL uses two parameter vectors to capture pose and shape: θ comprises 23 3D-rotation matrices corresponding to each joint in a kinematic tree for the human pose, and β captures shape variability across subjects in terms of a 10-dimensional shape vector. SMPL uses these parameters to obtain a triangulated mesh of the human body through linear skinning and blend shapes as a differentiable function of θ, β. In some embodiments, the parametric deformable model may be modified to allow it to be used more efficiently with convolutional neural networks, as described below in relation to FIG. 3.

A two dimensional image 104 is received, and input into a neural network 106. The two-dimensional image, I, comprises a set of pixel values corresponding to a two-dimensional array. For example, in a colour image, $I \in \mathbb{R}^{H \times W \times 3}$, where H is the height of the image in pixels, W is the height of the image in pixels and the image has three colour channels (e.g. RGB or CIELAB). The two dimensional image may, in some embodiments, be in black-and-white/greyscale.

The neural network may comprise a backbone network 206a, a keypoint localisation head 106b and a feature extraction head 106c. The neural network 106 may comprise one or more convolutional and/or deconvolutional layers/networks.

Neural networks comprise a plurality of layers of nodes, each node associated with one or more parameters. The parameters of each node of a neural network may comprise one or more weights and/or biases. The nodes take as input one or more outputs of nodes in the previous layer, or, in an initial layer, input data. The one or more outputs of nodes in the previous layer are used by each node to generate an activation value using an activation function and the parameters of the neural network. One or more of the layers of the neural network may be convolutional layers.

The backbone network 106a provides the initial, shared layers of the neural network 106. In the example shown, the backbone network is a ResNet-50 network, though it will be appreciated that other neural networks may alternatively be used as a backbone network. The output of the backbone neural network 206a is used as input into each of the later neural network heads 106b, 106c.

The neural network outputs keypoint locations in the image 108 from the keypoint localisation branch 106b of the neural network. The keypoints correspond to a pre-determined set of object landmarks within the image. Determining the locations of these keypoints effectively spatially anchors the object landmarks within the image.

Features 110 are extracted using the feature extraction branch 106c of the neural network. The positions where features are extracted co-varies with keypoint locations. The features are therefore invariant to global transformation and can focus on fine grained local patterns that better reveal the underlying 3D geometry.

Extracted features 110 are pooled to corresponding keypoints (such as visible joint locations in the image) using bilinear interpolation. A part-based regressor that pools convolutional features around 2D keypoint locations estimated by the keypoint localisation head 106b is used. This allows for the extraction of refined, localized features that are largely invariant to articulation, while at the same time keeping track of the presence/absence of parts. In particular, a part-based attention mechanism that limits the influence of any part to the parametric model parameters connected with it is used. This can limit the effect that missing parts can have on the global parametric model parameters and makes the model robust to occlusions.

Each feature extracted around a 2D keypoint; joint can deliver a separate parametric deformable model parameter estimate. But intuitively a 2D keypoint/joint should have a stronger influence on parametric deformable model parameters that are more relevant to it—for instance a left wrist joint should be affecting the left arm parameters, but not those of kinetically independent parts such as the right arm, head, or feet. Furthermore, the fact that some keypoints/joints can be missing from an image means that we cannot simply concatenate the features in a larger feature vector, but need to use a form that handles gracefully the potential absence of parts.

A linear layer 112 applied on top of the pooled extracted features is used to estimate parameters 114 of the parametric deformable model. The linear layer may, for example, output weights $w^i_{kj}$ 116 for use in determining the parametric deformable model parameters 114.

To determine the parametric deformable model angles, $\theta^i$, information from N(i), the neighbourhood of angle i, is used. In some embodiments, the angles $\theta^i$ may be determined using:

$$\theta^i = \frac{\sum_{k=1}^{K} \sum_{j \in N(i)} \exp(w^i_{k,j}) \theta_K}{\sum_{k=1}^{K} \sum_{j \in N(i)} \exp(w^i_{kj})}$$

An arg-soft-max operation may be used over angle clusters, and information from multiple 2D joints is fused: $w^i_{kj}$ indicates a score that 2D joint j assigns to cluster k for the i-th model parameter, $\theta^i$. The clusters can be defined as described below in relation to the "mixture-of-experts prior". The neighbourhood of i is constructed by inspecting which model parameters directly influence human 2D joints, based on kinematic tree dependencies. Joints are found in the image by taking the maximum of a 2D joint detection module. If the maximum is below a threshold (for example, 0:4 in some embodiments) it is considered consider that a joint is not observed in the image. In that case, every summand corresponding to a missing joint is excluded from the summations in the numerator and denominator, so that the above equation still delivers a distribution over angles. If all elements of N(i) are missing, $\theta^i$ is set to a resting pose.

Figure 2:
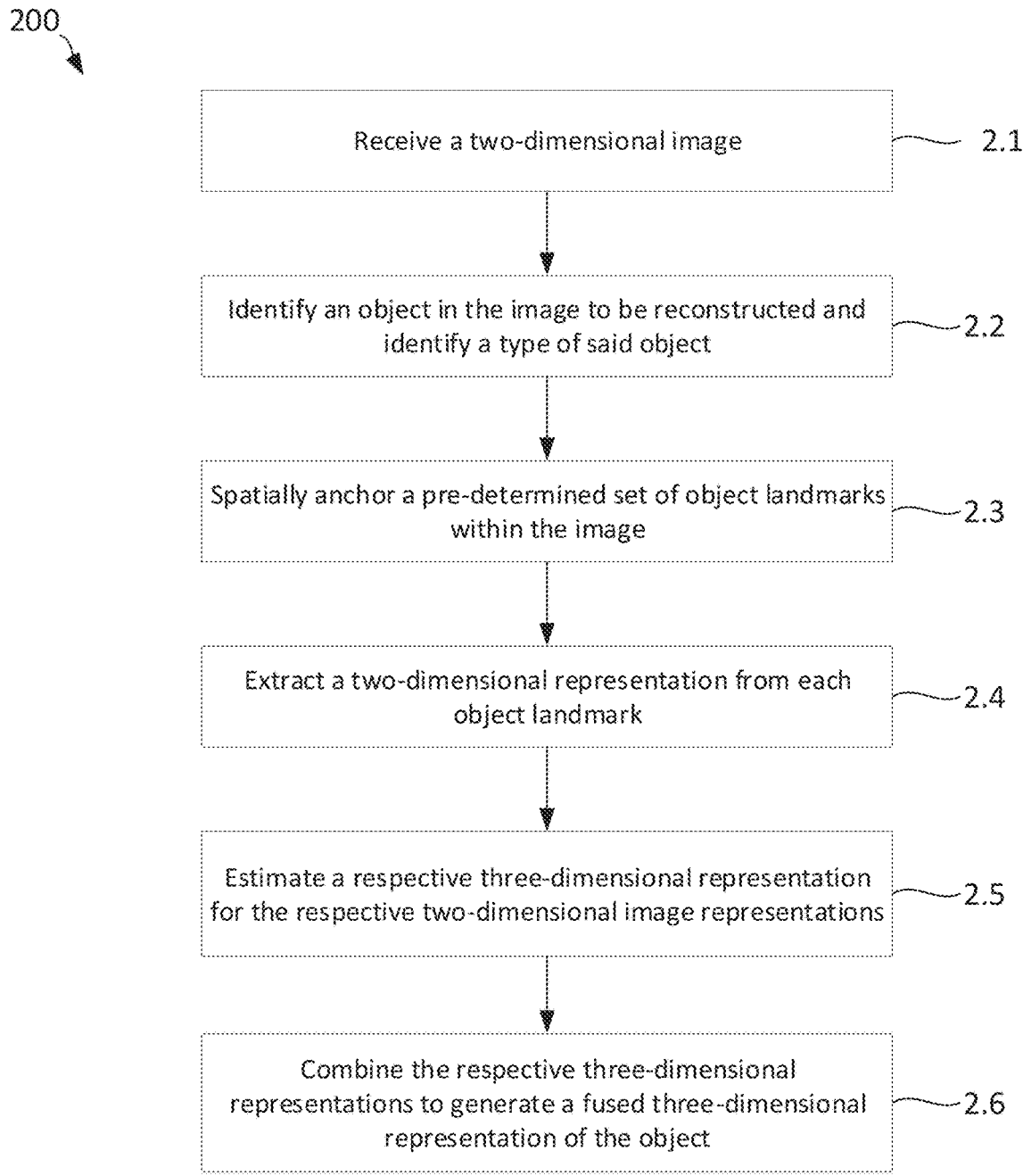
FIG. 2 shows a flow chart of an example method for creating a three-dimensional reconstruction from a two dimensional image.

FIG. 2 shows a flow chart of an example method 200 for creating a three-dimensional reconstruction from a two dimensional image. The method may be performed by one or more computing devices.

At operation 2.1, a two-dimensional image is received. As described above, the 2D image may comprise a set of pixel values corresponding to a two-dimensional array. In some embodiments, a single image is received. Alternatively, a plurality of images may be received. If multiple images are taken (for example, of a person moving), the three dimensional representation may account for these changes.

At operation 2.2, an object to be reconstructed is identified in the image. The object type of the identified object is also identified.

At operation 2.3, a predetermined set of object landmarks within the image are spatially anchored. Spatially anchoring may refer to locking into portions of the image which are of interest for computations. An object landmark may refer to portions of the object to be reconstructed which are identified as areas of interest for computation. For example, in the case that the object is a human, object landmarks may be joints of the human. The pre-determination of the object landmarks may, in some embodiments, be performed with the use of training sets or a training database which may be annotated by a human operator.

At operation 2.4, a two-dimensional image is extracted from each object landmark.

At operation 2.5, a respective three-dimensional representation is estimated for the respective two-dimensional image representations. Each respective three dimensional representation may comprise a corresponding set of possible orientation angles of the respective object landmark, and the method may further comprise applying a weighting to each orientation angle in the set of possible orientation angles based on a kinematic association of the respective object landmark to the respective possible orientation and visibility of the landmark in the received image.

Possible orientation angles may refer to all the possible positions a landmark may have. Each landmark may initially comprise a default set of possible orientations. Some embodiments focus on determining a more probable orientation within the default set given the estimated three-dimensional representation of the landmark. For example, in the instance when the object is a human and an object landmark is a shoulder, the orientation angles may represent the different rotational positions the shoulder-torso-upper arm joint (e.g., parts of the body associated or influenced by the shoulder) may take. In this example, the kinetic association may refer to an orientation angle that is more likely given another estimated object landmark. Visibility refers to whether or not a predetermined object landmark is visible in the received image. If the object landmark is not visible in the received image, the orientation angles associated with the non-visible landmark will not be by it.

Prior to the weighting, the method may further comprise identifying object landmarks, within the predetermined set of object landmarks, which are not visible in the two-dimensional image. Object landmarks, which are to be expected to be present due to the identified object type, may not be present in the image. For example, if the object type is a human, parts of the human body may not be visible due to posture or other items obstructing the view. This embodiment discusses identified such non-visible landmarks such that they may be given a lower weight as they will not be useful in the three-dimensional reconstruction.

At operation 2.6, the respective three-dimensional representations are combined to generate a fused three-dimensional representation of the object.

Combining the respective three-dimensional representations may further comprise decoupling respective estimated 3D representations of object landmarks which are kinematically independent. The term kinematically independent refers to how the movement of different object landmarks relates to the assumed three dimensional representation. For example, if the object is a human: an object landmark of an ankle would be kinematically independent from angle of the torso-leg joint as the motion of the leg will not affect the motion of an ankle. In contrast, if the object landmark is an elbow it not kinematically independent from the arm-torso movement as the motion of the arm will likely affect the movement or position of an elbow.

The method may further comprise applying the fused three-dimensional representation of the object to a part-based three-dimensional shape representation model. An example of such a model is a kinematic tree.

In embodiments where a plurality of images is received, operations 2.3 to 2.6 may be performed for each of the images in the plurality of images. This may be performed in real time as each image is received.

Operations 2.3 to 2.6 may be performed by a neural network, such as an encoder neural network. The neural network may have multiple heads, each outputting data relating to a different aspect of the method.

In some embodiments, a plurality of neural networks is available, and the neural network used is chosen based on identified object type. According to some of the example embodiments, the neural network may be specific to an object type. For example, a neural network may be dedicated to the three-dimensional representation of humans, while a different neural network may be dedicated to the three-dimensional representations of animals. It should be appreciated the set of predetermined object landmarks may also be specific to the identified object type. It should be appreciated neural networks and object landmarks may be dedicated to, for example, humans, animals, etc.

In some embodiments, the parametric model may be modified so that it more efficiently interfaces with convolutional neural network architectures. Examples of such modifications include "Cartesian surface parametrisation" and "Mixture-of-Experts Rotation Prior". These modifications may be combined with the parametric model together or independently. A uniform, Cartesian charting of the UV space within each part can be used, effectively reparametrizing the parametric model's eigenshape and blendshape and bases. This makes it simpler to implement mesh-level operations, resulting in a simple and fast GPU-based implementation of model refinement.

Cartesian surface parametrization reparametrizes a body surface with a locally Cartesian coordinate system. Even though the body surface as a continuous structure, it can be discretized using a triangulated mesh. This means that associating a pair of continuous UV coordinates with mesh attributes, e.g. 3D position, requires firstly identifying the facet that contains the UV coordinate, looking up the vertex values supporting the facet, and using the point's barycentric coordinates to interpolate these values. This can be inefficient in particular if it requires accessing disparate memory positions for different vertices.

It advantageous to reparametrize the body surface with a locally Cartesian coordinate system. This allows the above process to be replaced with bilinear interpolation and use a Spatial Transformer Layer to efficiently handle large numbers of points. In order to perform this re-parametrization, Multi-Dimensional Scaling is first performed to flatten parts of the parametric model surface to two dimensions and then these parts are sampled uniformly on a grid.

Figure 3:
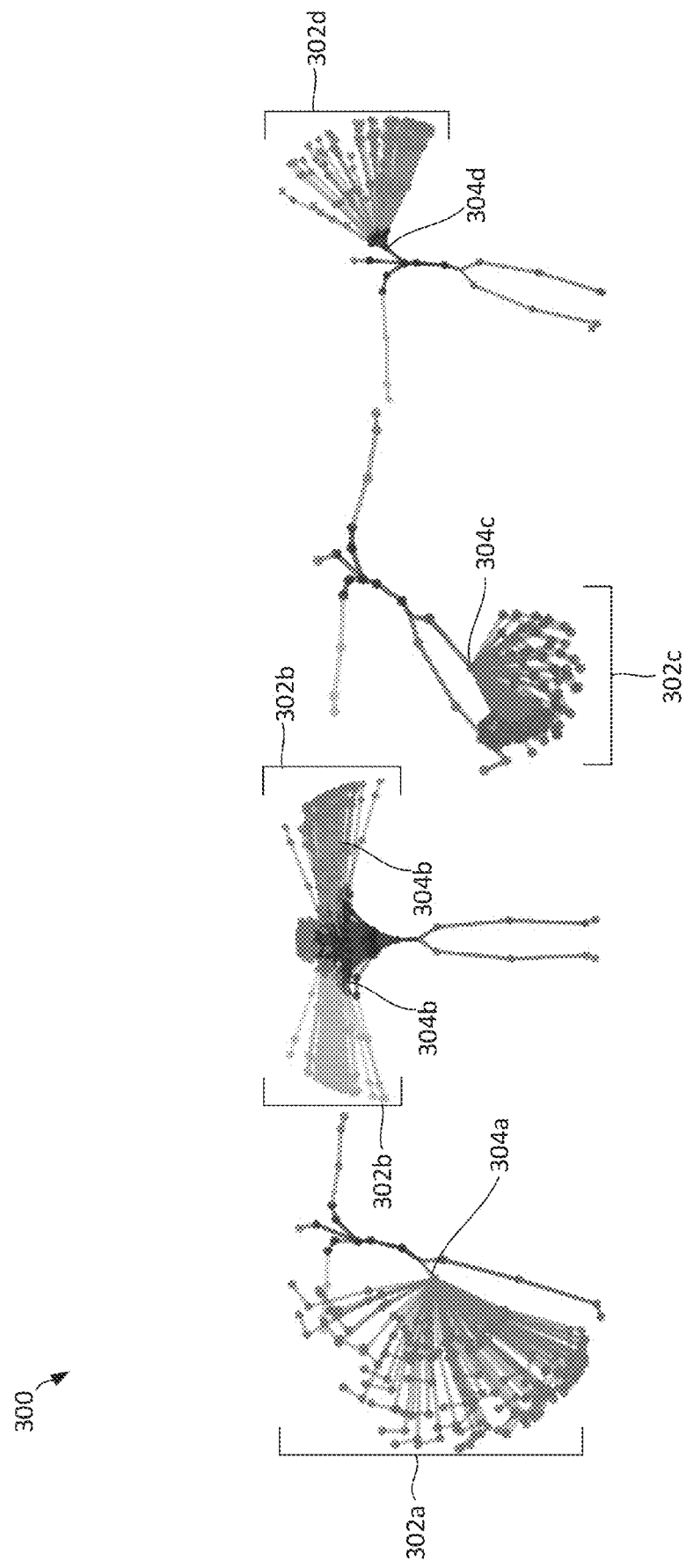
FIG. 3 shows an example of Euler angle cluster centres used in the Mixture-of-Experts rotation prior.

FIG. 3 shows an example of Euler angle cluster centres 300 used in the Mixture-of-Experts rotation prior. The range of possible joint angle values 302*a-d* for joints 304*a-d* is limited by the human body's mechanics. This can be exploited to increase the accuracy of our angle joint estimates. A simple and tight prior can be constructed by explicitly forcing the predictions of joint angles 302*a-d* to lie on the manifold of plausible shapes for said joint 304*a-d*.

Unlike earlier work that aimed at analytically modelling joint angles, recent works use classification as a proxy to rotation estimation (see, for example "*Viewpoints and keypoints*" by S. Tulsiani et at, Proceedings of the IEEE Conference on Computer Vision and Pattern Recognition, pages 1510-1519, 2015): rather than predict Euler angles, rotation estimation is cast as a classification problem where the classes correspond to disjoint angular bins. This approach is aligns with the empirical observation that CNNs can improve their regression accuracy by exploiting classification within regression.

Building on this direction, a 'mixture-of-experts' angle regression layer can be constructed using, for example, data collected by recording joint angles as humans stretch. These are expected to cover sufficiently well the space of possible joint angles. For each joint, joint rotations are represented as Euler angles, θ and compute K rotation clusters $\theta_1 \ldots \theta_K$ via K-Means. These clusters provide a set of representative angle values. The method/system is allowed to predict any rotation value within the convex hull of these clusters by using a softmax-weighted combination of the clusters. In particular the Euler rotation $\theta^i$, for the ith parametric model joint may be calculated as:

$$\theta^i = \frac{\Sigma_{k=1}^{K} \exp(w_K) \theta_K}{\Sigma_{k=1}^{K} \exp(w_K)}$$

where $w_k$ are real-value inputs to this layer (e.g. a set of weights output by the linear layer 112). This forms a plausible approximation to the underlying angle distribution, as shown in FIG. 3, while avoiding altogether the need for the adversarial training, since by design the estimated angles will be coming from this prior distribution. The output space of the joint regressors is limited to the convex hull of the centres, enforcing attainable joint rotations.

Figure 4:
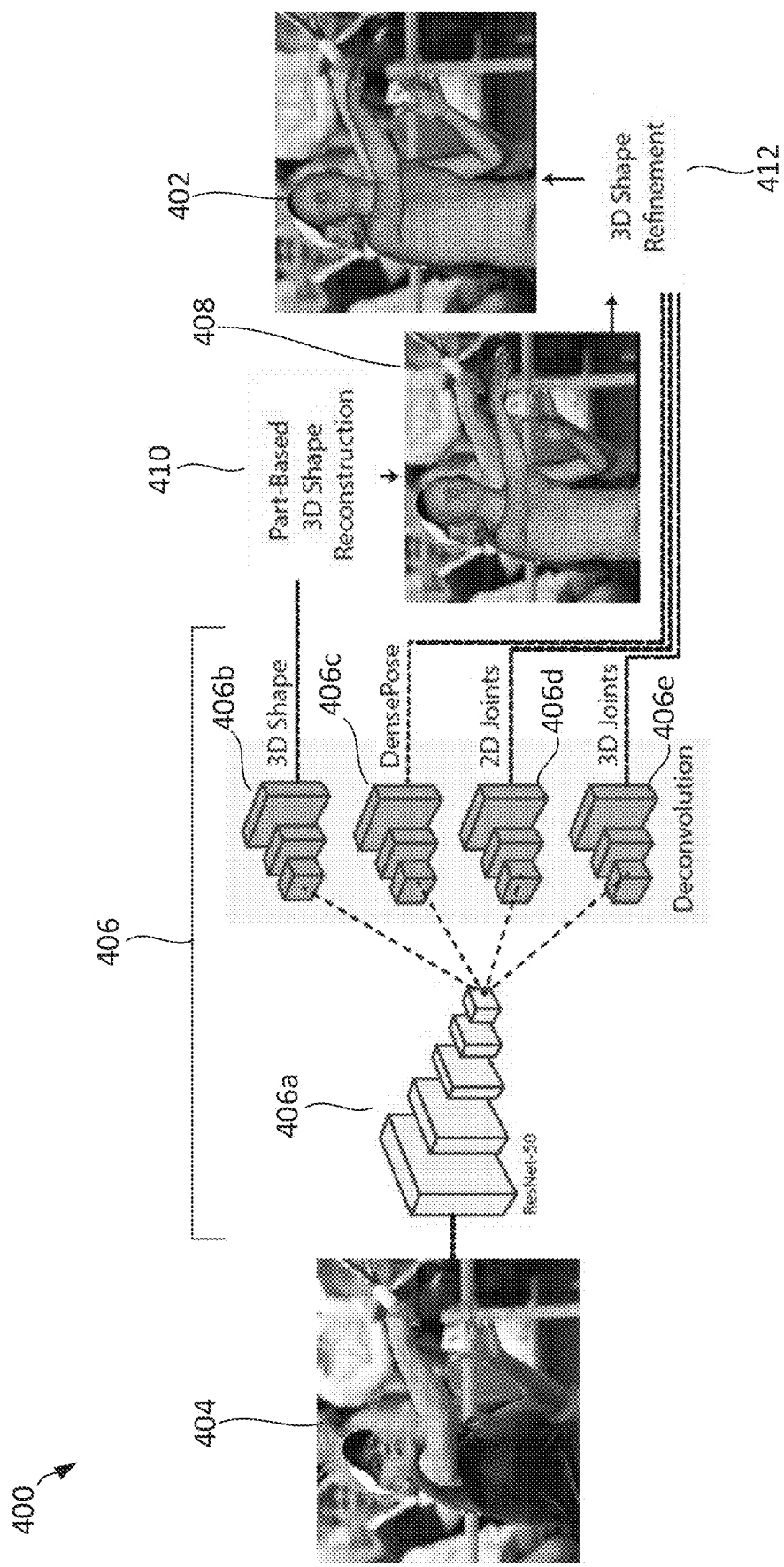
FIG. 4 shows a schematic overview of a method for refining a three-dimensional representation of an object.

FIG. 4 shows a schematic overview of a method 400 for refining a three-dimensional representation of an object 402.

Additional sets of data, such as DensePose and 3D joint estimation, can be used to increase the accuracy of 3D reconstruction. This may be done both by introducing additional losses that can regularize the training in a standard multi-task learning setup and by providing bottom-up, CNN-based cues to drive the top-down, model-based 3D reconstruction. For this, rather than relying on a CNN-based system to deliver accurate results in a single shot at test time, predictions from the CNN are used as an initialization to an iterative fitting procedure that uses the pose estimation results delivered by a 2D decoder to drive the model parameter updates. This can result in an effective 3D reconstruction. For this, the parametric model parameters are updated so as to align the parametric model-based and CNN-based pose estimates, as captured by a combination of a Dense Pose-based loss and the distances between the parametric model-based and CNN-based estimates of the 3D joints. This allows the parametric model parameters to be updated on-the-fly, so as to better match the CNN-based localization results.

The methods described above in relation to FIGS. 1-2 provide a 'bottom-up' estimate of the body's 3D surface in a single-shot, i.e. through a forward pass in the network. In the same feedforward manner 2D keypoints, 3D joint locations, and/or Dense-Pose [13] estimates can be obtained through fully-convolutional networks. 2D keypoints are already obtained during the methods described in relation to FIGS. 1-2 as part of the part-based pooling, but a combined treatment of all tasks can improve the end goal of accurate 3D surface reconstruction.

The methods described above in relation to FIGS. 1-3 perform 3D reconstruction. However, there is often scarce supervision for this task. By contrast large-scale datasets exist for 2D pose estimation. These datasets can be exploited by training the network in a multi-task setting, so that it delivers not only parametric deformable model parameters, but also DensePose, 2D, and 3D joint predictions. This can improve the parametric deformable model parameter estimation thanks to multi-tasking, and also provide a versatile pose estimation model. Going beyond this improvement, external pose datasets can be further leveraged in a manner that exploits the geometric nature of the task.

Having a 3D surface estimate allows for the prediction in a differentiable manner of 3D joint positions, their 2D projections, and dense surface-to-image correspondences. Thus, external pose information can be used to construct a loss function that indicates the quality of our surface estimate in terms of geometric distances. This can be achieved in two ways: firstly, multiple pose estimation cues are used for network supervision during training. Secondly, a refinement process that forces the model-based 3D geometry to agree with a neural network's predictions through an iterative scheme is used. In both cases the geometric nature of the problem is exploited. A loss that penalizes deviations between the 3D model-based predictions and the pose information provided by complementary cues is used.

The method 400 proceeds in a similar way to the method described above with respect to FIGS. 1-3. A two dimensional image 404 is received, and input into a neural network 406. The neural network 406 processes the input image 404 to generate an initial 3D model 408 (i.e. a fused three-dimensional model/3D surface estimate) of objects in the image (e.g. a human body) using part-based 3D shape reconstruction 410 (for example, as described above). The neural network further outputs 2D keypoint locations (e.g. 2D joints), 3D keypoint locations (e.g. 3D joints) and a DensePose estimate. Each of these may be output from a different head 406*b-e* of the neural network 406. The neural network 406 may comprise one or more convolutional and/or deconvolutional layers/networks. The initial layers of the neural network 406 may be shared and form a backbone network 406*a*, In the example shown, the backbone network 406*a* is a ResNet-50 network, though other networks may alternatively be used.

The initial 3D model 408 may be refined using a 3D shape refinement process 412. The 3D shape refinement process 412 takes as input a 3D model, 2D keypoint locations, 3D keypoint locations and the DensePose estimate for the corresponding 2D image, and uses them to refine the 3D model to generate a refined 3D model of the object 402.

The 3D shape refinement process 412 may comprise projecting the 3D model 408 onto a 2D image plane to obtain a projected representation. The positions in the projected representation are compared to the object in the input image 404 to determine an error value (for example, using a loss function). Parameters of the 3D model 408 may then be adjusted based on the error value to determine an updated 3D model. The process may be iterated until a threshold condition is met.

The loss function used to determine the error may comprise one or more geometric losses, such as a 2D keypoints loss ($L_{Kps\text{-}2D}$), a 3D keypoints loss ($L_{Kps\text{-}3D}$), and/or a DensePose Loss ($L_{DP}$). These loss functions may also be used when training the neural network 406.

The 2D keypoints loss ($L_{Kps\text{-}2D}$) compares the locations of 2D keypoints in the projected representation to the locations of corresponding keypoints in the input image 204 that have been determined by the 2D keypoint head 406d of the neural network 406. A geometric distance can be used as the comparison.

The 3D keypoints loss ($L_{Kps\text{-}3D}$) compares the locations of 3D keypoints in the 3D model 408 to the locations of corresponding 3D keypoints in the input image 204 that have been determined by the 3D keypoint head 406e of the neural network 406. A geometric distance can be used as the comparison.

The DensePose Loss ($L_{DP}$) compares DensePose locations of the 3D model 408 to the DensePose estimate that has been determined by the DensePose head 406c of the neural network 406.

DensePose associates an image position $x=(x_1, x_2)$ with an intrinsic surface coordinate, $u=(u_1, u_2)$. Given a set of parameters of a 3D Parametric Deformable Model (PDM), $\phi$ (e.g. SMPL parameters, $\phi=(\theta,\beta)$), each u vector can be associated with a 3D position $X(\phi)$, which can in turn be projected to a 2D position estimate, $\hat{x}(\phi)=(\hat{x}_1, u_{\hat{x}_2})$. The DensePose loss penalises a geometric distance between $\hat{x}(\phi)$ and $x=(x_1, x_2)$, requiring that ($\phi$) yields a shape that projects correctly in 2D. In summary, DensePose is associated with the following process and loss:

$$X \xrightarrow{DensePose} u \xrightarrow{PDM(\phi)} X \xrightarrow{P} \hat{x}$$

$$\mathcal{L}_{DensePose}(\phi) = \sum_i \|x_i - \hat{x}_i\|$$

where $\hat{x}=P(PDM_\phi(DensePose(x)))$ is the model-based estimate of where x should be, and i ranges over the image positions that become associated with a surface coordinate.

The use of these losses can exploit the complementary advantages of the outputs of the head 406b-e of the neural network 406. On the one hand the model-based estimate is inherently dense, 3D, compact, and bound to correspond to a plausible human pose—this is often not the case for the neural network 406 estimates, whose feedforward architecture makes it hard to impose lateral constraints between parts. On the other hand the neural network 406 based estimates inspect and score exhaustively every image patch, allowing us to precisely localize human structures in images. By contrast, model-based estimates can be grossly off, e.g. due to some miscalculated angle in the beginning of the kinematic tree.

The use of these losses brings these complementary factors into accord by forcing the model-based estimate of 3D structure to be compliant with the neural network 406 based DensePose/2D/3D keypoint predictions. For this, the neural network based prediction is treated as an initialization of an iterative fitting scheme driven by the sum of the geometric losses.

The Cartesian parameterisation outlined above can also allow for the quick evaluation of losses, and backpropagation through the losses using, for example, Spatial Transformer Networks. This can provide a GPU-based implementation of 3D model fittings to 2D images.

Figure 5:
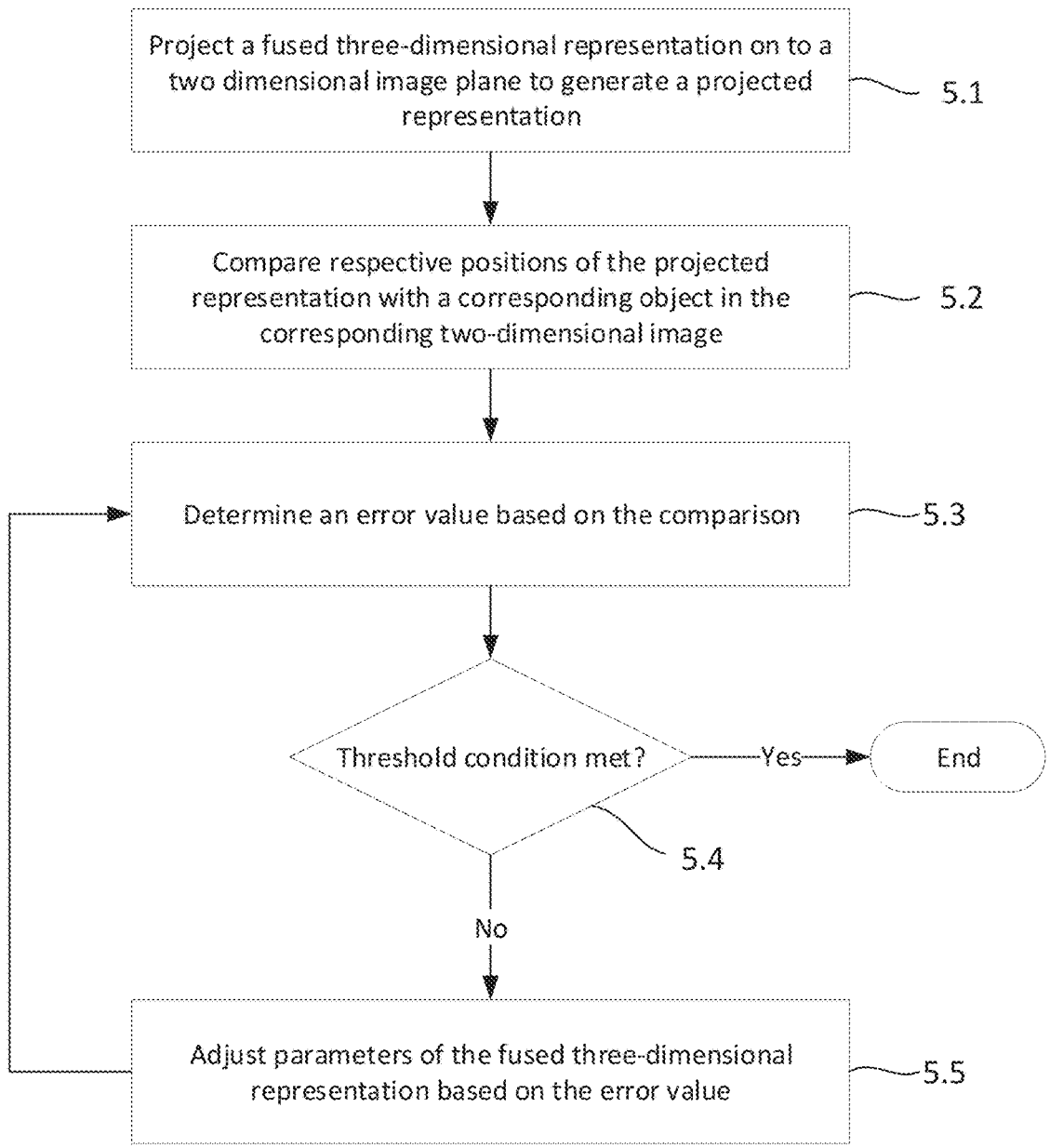
FIG. 5 shows a flow chart of an example method for updating a fused three-dimensional representation of an object.

FIG. 5 shows a flow chart of an example method 500 for updating a fused three-dimensional representation of an object. The method may correspond to the 3D shape refinement process 412 of FIG. 4.

At operation 5.1, a fused three-dimensional representation is projected on to a two dimensional image plane to generate a projected representation.

At operation 5.2, respective positions of the projected representation are compared with a corresponding object in the corresponding two-dimensional image.

The comparison may comprise comparing respective positions of object landmarks and surface-based points of the projected representation and the single two-dimensional image. According to some of the example embodiments both the object landmarks and the surface-based points of the projected representation may be used in the comparison. This can provide an accurate measurement of the error due to misalignment.

The method may further comprise obtaining a Cartesian sampling or charting of a known surface model based on a detected object type of the object in the single two-dimensional image. This may not necessarily be performed at every iteration. The obtaining step may be performed in order to provide the initial learning-based optimization method.

At operation 5.3, an error value is determined based on the comparison. The error may also be referred to as a refinement loss. The refinement loss may comprise a number of components. For example, the loss function may comprise one or more of: a 2D keypoints loss ($L_{Kps\text{-}2D}$); a 3D keypoints loss ($L_{Kps\text{-}3D}$); and/or a DensePose Loss ($L_{DP}$).

At operation 5.4, a threshold condition is checked. The threshold condition may be error value falling below a predetermined threshold value and/or when a threshold number of iterations is surpassed.

If the threshold condition is satisfied, the method ends. The fused 3D representation will be output.

If the threshold condition is not satisfied, the method continues.

At operation 5.5, parameters of the fused three-dimensional representation are adjusted based on the error value. The adjustment may be performed using learning based optimisation methods.

It will be appreciated that the evaluation of the threshold condition may alternatively occur after the parameters have been updated in operation 5.5.

Figures 6A, 6B:
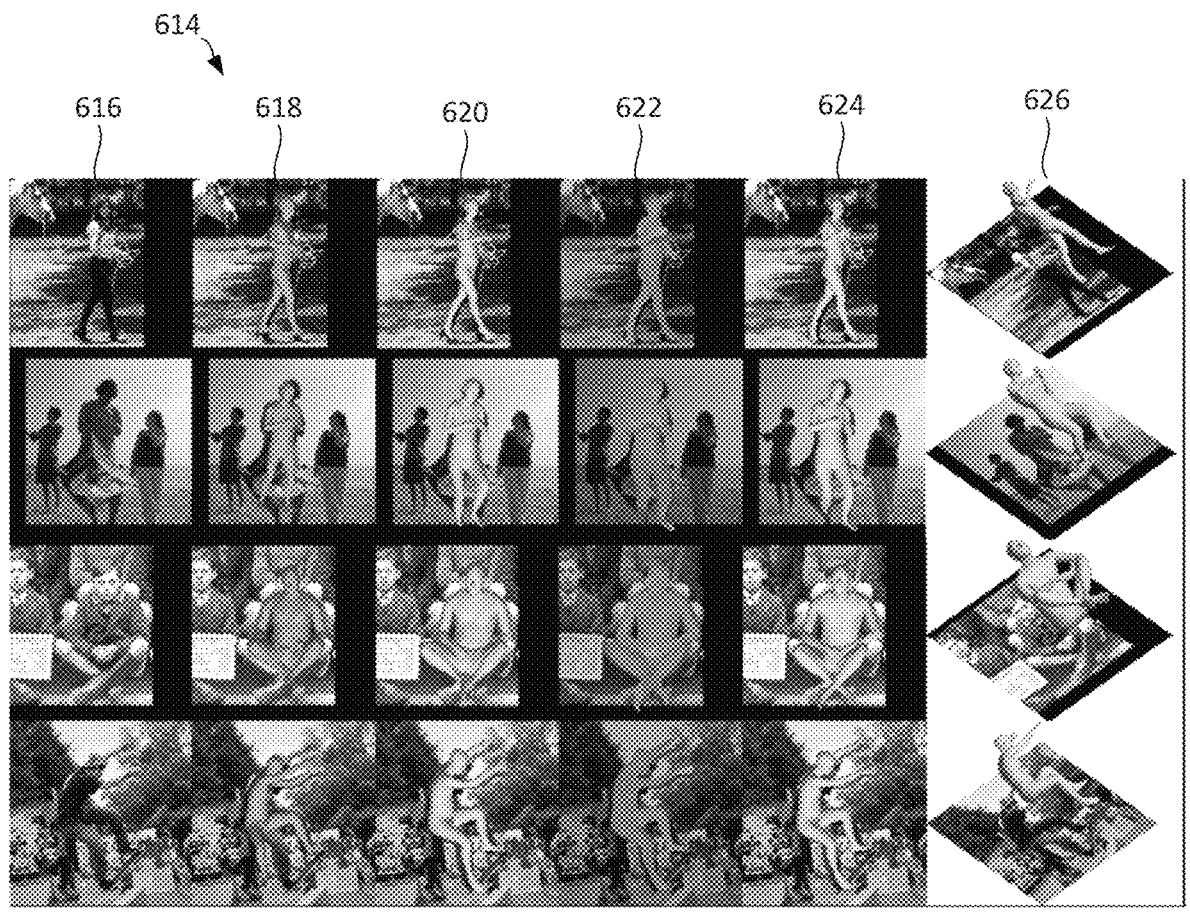
FIG. 6a shows a table of DensePose and 3D keypoint errors achieved using various refinement techniques.
FIG. 6b shows examples of the qualitative results of methods disclosed herein.

FIGS. 6a and 6b show examples of the results of the refinement method. FIG. 6a shows a table 600 of DensePose and 3D keypoint errors achieved using various refinement techniques. The effects of different refinement loss choices on the performance of two tasks (dense correspondence estimation in-the-wild and 3D keypoint localisation) are shown. The second column 602 shows the base performance. Base performance refers to the output of the neural network without refinement, such as the method described above in relation to FIGS. 1-3, The third column 604 shows the error when a 2D keypoints loss ($L_{Kps\text{-}2D}$) is used for the refinement method. The fourth column 606 shows the error when a 3D keypoints loss ($L_{Kps\text{-}3D}$) is used for the refinement method. The fifth column 608 shows the error when a DensePose loss ($L_{DP}$) is used for the refinement method. The sixth column 610 shows the error when both a 2D keypoints loss and DensePose loss ($L_{Kps\text{-}2D}+L_{DP}$) is used for the refinement method. The seventh column 612 shows the error when both a 3D keypoints loss and DensePose loss ($L_{Kps\text{-}3D}+L_{DP}$) is used for the refinement method.

FIG. 6b shows examples 614 of the qualitative results of methods disclosed herein. The first column 616 shows examples of input images. The second column 618 shows examples of 3D models resulting from the use of MIR. The third column 620 shows examples of the 3D models obtained by the methods disclosed in FIGS. 1-3. The fourth column 622 shows examples of the refinements obtained by the methods disclosed in FIGS. 4-5. The fifth 624 and sixth 626 columns show examples of the 3D models obtained by after refinements have been applied.

In some embodiments, the neural networks used in the methods described above comprise an ImageNet pre-trained ResNet-50 network as a system backbone. Each dense prediction task may use a deconvolutional head, following the architectural choices of "*Simple baselines for human pose estimation and tracking*" (B. Xiao et al., arXiv: 1804.06208, 2018), with threes 4×4 deconvolutional layers applied with batch-norm and ReLU. These are followed by a linear layer to obtain outputs of the desired dimensionality. Each deconvolution layer has a stride of two, leading to an output resolution of 64×64 given 256×256 images as input.

The neural networks described herein can, in some embodiments, be trained in two stages. In the first stage, 3D Keypoint and 2D Keypoint heads are trained. A combination of the MPH and H36m datasets may be used to train the 3D Keypoint and 2D Keypoint heads. An example of method that can be used to train the 3D Keypoint and 2D Keypoint heads can be found in "*Integral human pose regression*" (X. Sun et al., arXiv:1711.08229, 2017).

In a second training stage a DensePose head and a part-based 3D reconstruction head can be appended to the neural network. The whole system can then be trained end-to-end. The part-based 3D reconstruction head may, for example, be trained using 2D and 3D key points and dense correspondences present in all datasets mentioned above.

In some embodiments, neural mesh synthesis models may be used; the use of a distributed representation may more easily accommodate multi-modal distributions, encompassing male, female and child surfaces, which are currently treated by separate shape models. Furthermore, more accurate modelling of geometry may be used, for instance by incorporating perspective projection, surface normal and contour information. Depth data, multiple views, and/or temporal information may also be used to help disambiguate 3D reconstruction errors.

Figure 7:
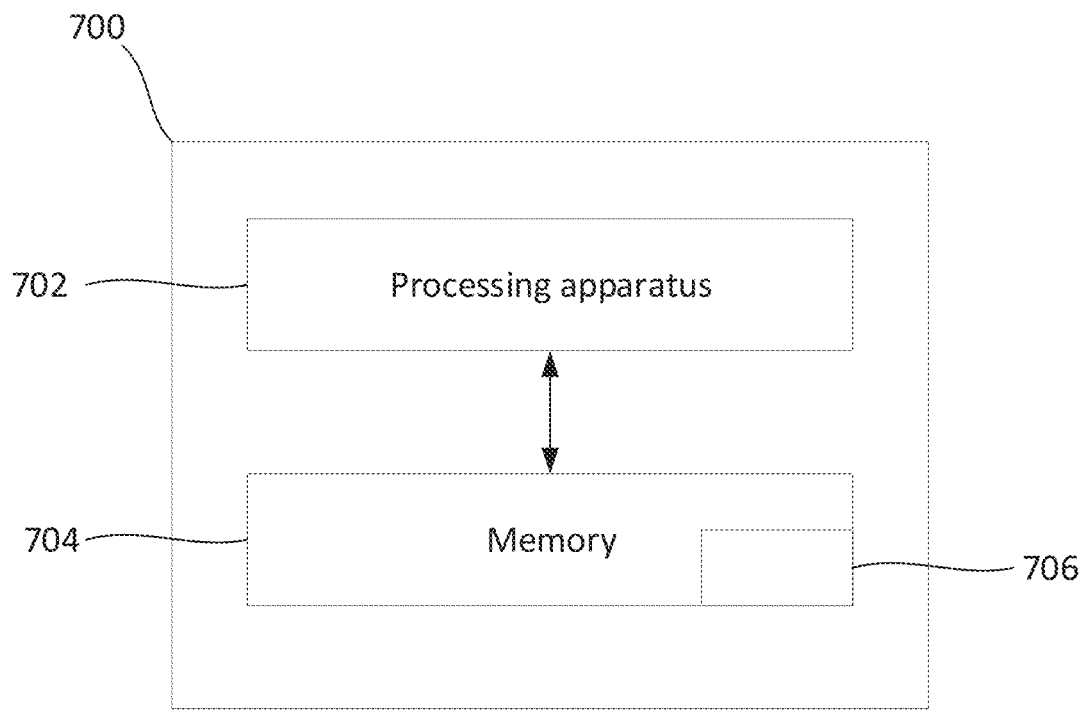
FIG. 7 shows an example of a computational unit.

FIG. 7 shows an example of a computational unit/apparatus. The apparatus 700 comprises a processing apparatus 702 and memory 704 according to an exemplary embodiment, Computer-readable code 706 may be stored on the memory 704 and may, when executed by the processing apparatus 702, cause the apparatus 700 to perform methods as described herein.

The processing apparatus 702 may be of any suitable composition and may include one or more processors of any suitable type or suitable combination of types. Indeed, the term "processing apparatus" should be understood to encompass computers having differing architectures such as single/multi-processor architectures and sequencers/parallel architectures. For example, the processing apparatus may be a programmable processor that interprets computer program instructions and processes data. The processing apparatus may include plural programmable processors. Alternatively, the processing apparatus may be, for example, programmable hardware with embedded firmware. The processing apparatus may alternatively or additionally include Graphics Processing Units (GPUs), or one or more specialised circuits such as field programmable gate arrays FPGA, Application Specific Integrated Circuits (ASICs), signal processing devices etc. In some instances, processing apparatus may be referred to as computing apparatus or processing means.

The processing apparatus 702 is coupled to the memory 704 and is operable to read/write data to/from the memory 704. The memory 704 may comprise a single memory unit or a plurality of memory units, upon which the computer readable instructions (or code) is stored. For example, the memory may comprise both volatile memory and non-volatile memory. In such examples, the computer readable instructions/program code may be stored in the non-volatile memory and may be executed by the processing apparatus using the volatile memory for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the example embodiments presented herein.

What is claimed is:

1. A computer-implemented method for creating a three-dimensional (3D) reconstruction from a two-dimensional (2D) image comprising a plurality of object landmarks corresponding to an object, the method comprising:
- extracting a 2D image representation from each object landmark to generate a plurality of 2D images each corresponding to a different object landmark;
- estimating a respective 3D representation for each of the plurality of 2D images, each respective separate 3D representation representing a corresponding set of possible orientation angles of the different object landmarks, the possible orientation angles referring to all possible positions of an object landmark;
- applying a weighting to each orientation angle in the set of possible orientation angles based on a kinematic association of the respective object landmark associated with a respective one of the plurality of separate 3D representations;
- reducing a weight of the set of possible orientation angles corresponding to one or more object landmarks that are missing from the object; and
- combining the respective 3D representations comprising the plurality of separate 3D representations of each of the different object landmarks, resulting in a fused 3D representation of the object.

2. The method of claim 1, further comprising:
applying a function to the 2D image representation to determine an orientation angle of each of a plurality of joints of the object, the function comprising summations in a numerator and denominator, the one or more object landmarks that are missing from the object being excluded from the summations in the numerator and denominator.

3. The method of claim 1, wherein spatially anchoring, extracting, estimating and combining are performed in an encoder neural network.

4. The method of claim 3, wherein the encoder neural network is one of a plurality of encoder networks, the method further comprising choosing the encoder neural network based on an identified object type.

5. The method of claim 1, wherein the combining further comprises:
- decoupling respective estimated 3D representations of object landmarks which are kinematically independent, wherein each respective estimated 3D representation comprises a corresponding set of possible orientation angles of the respective object landmark; and
- applying a weighting to each orientation angle in the set of possible orientation angles based on a kinematic association of the respective object landmark to the respective possible orientation and visibility of the landmark.

6. The method of claim 1, further comprising applying the fused 3D representation of the object to a part-based 3D shape representation model.

7. The method of claim 6, wherein the part-based 3D shape representation model is a kinematic tree.

8. The method of claim 1, further comprising:
- computing a maximum of an output of a 3D joint detection module to identify the set of object landmarks;
- comparing the maximum to a threshold; and
- in response to determining that the maximum fails to transgress the threshold, determining that the object landmark of the set of object landmarks corresponds to the one or more object landmarks that are missing from the identified object.

9. The method of claim 1, wherein each of the plurality of 2D images corresponds to a different joint of the plurality of joints on a human body.

10. The method of claim 1, further comprising:
determining that the one or more object landmarks that are missing from the object are not visible in the 2D image.

11. The method of claim 1, further comprising assigning a lower weight to the one or more object landmarks that are missing from the object in generating the fused 3D representation of the object.

12. The method of claim 1, further comprising:
- determining that a type of object corresponds to an animal; and
- selecting a neural network specific to the animal to perform estimating the respective 3D representation for the respective 2D image representations.

13. The method of claim 1, wherein each of the plurality of separate 3D representations represents a corresponding set of possible orientation angles of the different object landmarks, the possible orientation angles referring to all possible positions of an object landmark, further comprising:
- applying a weighting to each orientation angle in the set of possible orientation angles based on a kinematic association of the respective object landmark associated with a respective one of the plurality of separate 3D representations; and
- reducing a weight of the set of possible orientation angles corresponding to the one or more object landmarks that are missing from the object.

14. A system comprising:
- a storage device; and
- at least one processor coupled to the storage device, wherein at least one processor is configured to perform operations for creating a three-dimensional (3D) reconstruction from a two-dimensional (2D) image comprising a plurality of object landmarks corresponding to an object, the operations comprising:
  - extracting a 2D image representation from each object landmark to generate a plurality of 2D images each corresponding to a different object landmark;
  - estimating a respective 3D representation for each of the plurality of 2D images, each respective separate 3D representation representing a corresponding set of possible orientation angles of the different object landmarks, the possible orientation angles refer to all possible positions of an object landmark;
  - applying a weighting to each orientation angle in the set of possible orientation angles based on a kinematic association of the respective object landmark associated with a respective one of the plurality of separate 3D representations;
  - reducing a weight of the set of possible orientation angles corresponding to one or more object landmarks that are missing from the object; and
  - combining the respective 3D representations comprising the plurality of separate 3D representations of each of the different object landmarks, resulting in a fused 3D representation of the object.

15. The system of claim 14, wherein the operations comprise:
- computing a maximum of an output of a 2D joint detection module to identify the set of object landmarks;
- comparing the maximum to a threshold; and
- in response to determining that the maximum fails to transgress the threshold, determining that the object landmark of the set of object landmarks corresponds to the one or more object landmarks that are missing from the identified object.

16. The system of claim 14, wherein the operations comprise:
   determining that the one or more object landmarks that are missing from the object are not visible in the 2D image.

17. The system of claim 14, wherein the operations comprise:
   assigning a lower weight to a set of orientation angles associated with the one or more object landmarks that are missing from the object in generating the fused 3D representation of the object.

18. The system of claim 14, wherein the operations comprise:
   applying a function to the 2D image representation to determine an orientation angle of each of a plurality of joints of the object, the function comprising summations in a numerator and denominator, the one or more object landmarks that are missing from the object being excluded from the summations in the numerator and denominator.

19. The system of claim 14, wherein spatially anchoring, extracting, estimating and combining are performed in an encoder neural network.

20. A non-transitory computer readable medium that stores a set of instructions that is executable by at least one processor to perform operations for creating a three-dimensional (3D) reconstruction from a two-dimensional (2D) image comprising a plurality of object landmarks corresponding to an object, the operations comprising:
   extracting a 2D image representation from each object landmark to generate a plurality of 2D images each corresponding to a different object landmark;
   estimating a respective 3D representation for each of the plurality of 2D images, each respective separate 3D representation representing a corresponding set of possible orientation angles of the different object landmarks, the possible orientation angles referring to all possible positions of an object landmark;
   applying a weighting to each orientation angle in the set of possible orientation angles based on a kinematic association of the respective object landmark associated with a respective one of the plurality of separate 3D representations;
   reducing a weight of the set of possible orientation angles corresponding to one or more object landmarks that are missing from the object; and
   combining the respective 3D representations comprising the plurality of separate 3D representations of each of the different object landmarks, resulting in a fused 3D representation of the object.

* * * * *

UNITED STATES PATENT AND TRADEMARK OFFICE
CERTIFICATE OF CORRECTION

| | | |
|---|---|---|
| PATENT NO. | : 12,437,429 B2 | Page 1 of 1 |
| APPLICATION NO. | : 18/477146 | |
| DATED | : October 7, 2025 | |
| INVENTOR(S) | : Guler et al. | |

It is certified that error appears in the above-identified patent and that said Letters Patent is hereby corrected as shown below:

On the Title Page

On page 2, in Column 2, item (56) under "Other Publications", Line 12, delete "Mutli-Person" and insert --Multi-Person-- therefor Signed and Sealed this
Ninth Day of December, 2025

John A. Squires
*Director of the United States Patent and Trademark Office*